United States Patent
Zhang et al.

(10) Patent No.: US 8,168,101 B2
(45) Date of Patent: May 1, 2012

(54) INORGANIC MEMBRANE DEVICES AND METHODS OF MAKING AND USING THE SAME

(75) Inventors: Anping Zhang, Rexford, NY (US); Peter Paul Gipp, Schenectady, NY (US); Oliver Charles Boomhower, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 190 days.

(21) Appl. No.: 12/544,305

(22) Filed: Aug. 20, 2009

(65) Prior Publication Data

US 2011/0042301 A1    Feb. 24, 2011

(51) Int. Cl.
  *B28B 1/48* (2006.01)
  *C03C 25/68* (2006.01)
  *B01D 39/00* (2006.01)

(52) U.S. Cl. ...... 264/154; 216/41; 427/244; 210/500.25

(58) Field of Classification Search ............ 210/500.25, 210/500.26, 490; 427/244, 245; 264/601, 264/4, 41, 138, 139, 154; 216/41
See application file for complete search history.

(56) References Cited

U.S. PATENT DOCUMENTS

| | | | |
|---|---|---|---|
| 5,543,046 A * | 8/1996 | Van Rijn | 210/490 |
| 5,753,014 A | 5/1998 | Van Rijn | |
| 5,985,164 A * | 11/1999 | Chu et al. | 216/41 |
| 7,282,148 B2 * | 10/2007 | Dalton et al. | 210/500.25 |
| 7,468,529 B2 * | 12/2008 | Kawai et al. | 257/102 |
| 7,540,963 B2 | 6/2009 | Fissell, IV et al. | |
| 2007/0231887 A1 | 10/2007 | McGrath et al. | |
| 2008/0083697 A1 | 4/2008 | Dalton et al. | |
| 2008/0223795 A1 | 9/2008 | Bakajin et al. | |

FOREIGN PATENT DOCUMENTS

WO    2006119251 A2    11/2006

OTHER PUBLICATIONS

Christopher C. Striemer, Thomas R. Gaborski, James L. McGrath and Philippe M. Fauchet; "Charge- and size-based separation of macromolecules using ultra thin silicon membranes"; Nature 445, 749-753 (Feb. 15, 2007)| doi:10.1038/nature05532; Received Mar. 23, 2006; Accepted Nov. 20, 2006; 8Pages.

* cited by examiner

*Primary Examiner* — Ana Fortuna
(74) *Attorney, Agent, or Firm* — Jennifer E. Haeckl

(57) ABSTRACT

An inorganic membrane device is provided. The device comprises a substrate having a network of pores, and a membrane layer at least partially coupled to the substrate and having a plurality of pores, wherein the pores have an aspect ratio in a range from about 1:2 to about 1:100.

13 Claims, 3 Drawing Sheets

INORGANIC MEMBRANE DEVICES AND METHODS OF MAKING AND USING THE SAME

BACKGROUND

The invention relates to methods for fabricating inorganic membrane devices, and more particularly to methods for fabricating inorganic membrane devices for separating biomolecules.

Typically, membrane filters are employed in biological applications involving separation of molecules in biological fluids. Most of the membrane filters employ polymer membranes or ceramic membranes. For example, cellulose and its derivatives, polysulfone, polyacrylonitride (PAN), poly(m-ethylmethacrylate) (PMMA), polyamide, polypropylene, polycarbonatem, polyester, polyvinylidene fluoride, anodic aluminum oxide are some of the materials used to make membranes. Disadvantageously, most of the existing membranes have broad pore size distribution. In other words, the sizes of the pores in a given membrane are inconsistent and vary greatly over a large range. Due to large pore size distribution, the separation process suffers significant product loss. For example, species pass through the filter due to large pore size distribution when they should be retained. Another disadvantage is that these membranes are quite thick and, as a result, have relatively low flux rates, thereby adversely affecting the throughput of the filtration process. These ceramic membranes also typically lack the robustness needed to scale up for protein and other biomolecule processing.

Some demanding filtration applications, for example virus filtration or clearance, require very small pore sizes (15 nanometers to 35 nanometers) and high flux rate. The membrane needs to have very narrow pore distribution to achieve greater than 5 logs virus reduction. The filtration layer of the membrane also needs to be very thin to achieve high flux rates because the filtration resistance can be very high for a pore size in a range from about 15 nanometers to about 35 nanometers. The ultrathin inorganic membranes, such as silicon or silicon nitride membranes, have very narrow pore size distribution in a broad range of nanopores from 5 nanometers to greater than 1 micrometer, and very thin membrane layers from 10 nanometers to greater than about 1 micrometers.

Therefore, it would be desirable to provide a method for making a membrane that has uniform pore size distribution and enhanced robustness for use in virus filtration.

BRIEF DESCRIPTION

In one embodiment, an inorganic membrane device is provided. The device comprises a substrate having a network of pores, and a membrane layer at least partially coupled to the substrate and having a plurality of pores, wherein the pores have an aspect ratio in a range from about 1:2 to about 1:100.

In another embodiment, a method of making an inorganic membrane device is provided. The method comprises disposing a high etch resistant mask layer on a membrane layer, wherein the membrane layer is disposed on a substrate, disposing a pore forming layer on the high etch resistant mask layer, forming pores in the pore forming layer, forming pores in the high etch resistant mask layer, and forming pores in the membrane layer.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
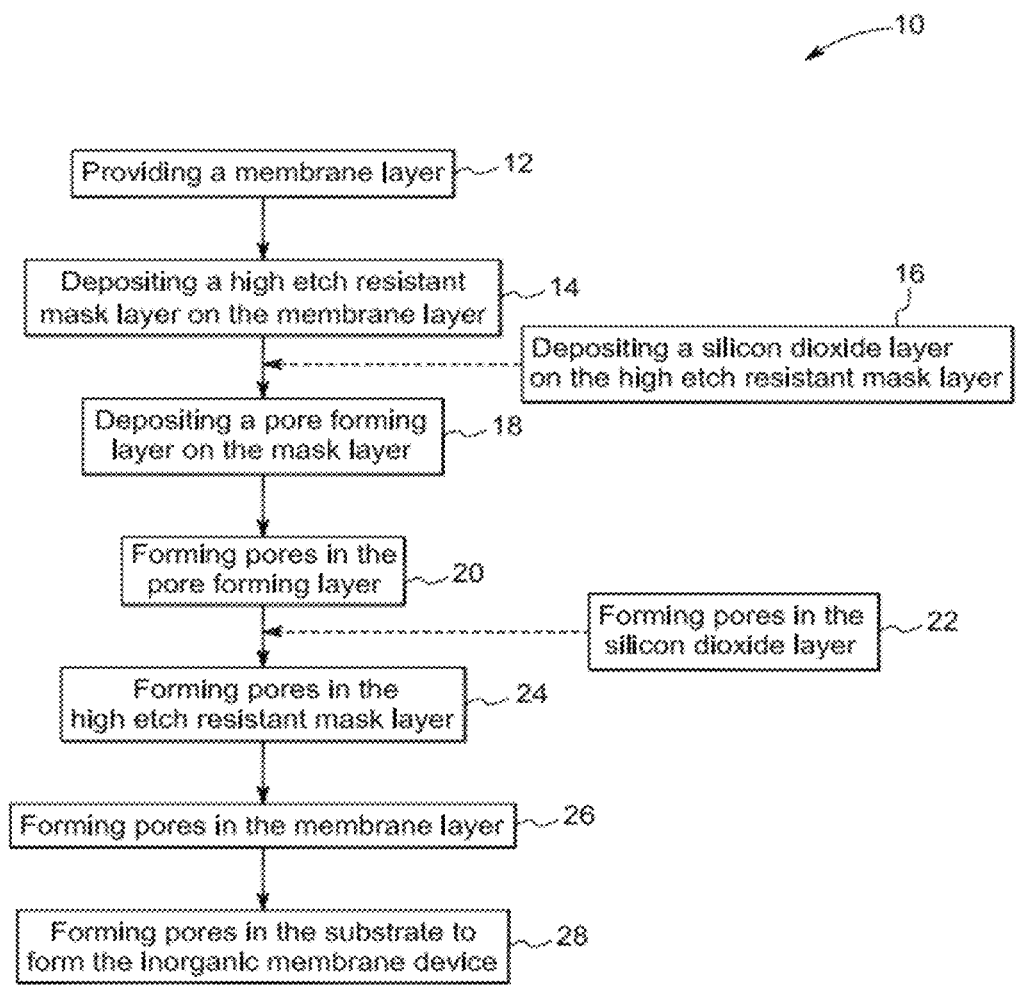
FIG. 1 is a flow chart illustrating an example of various steps of the method for fabricating membrane devices of the invention.
Figure 2:
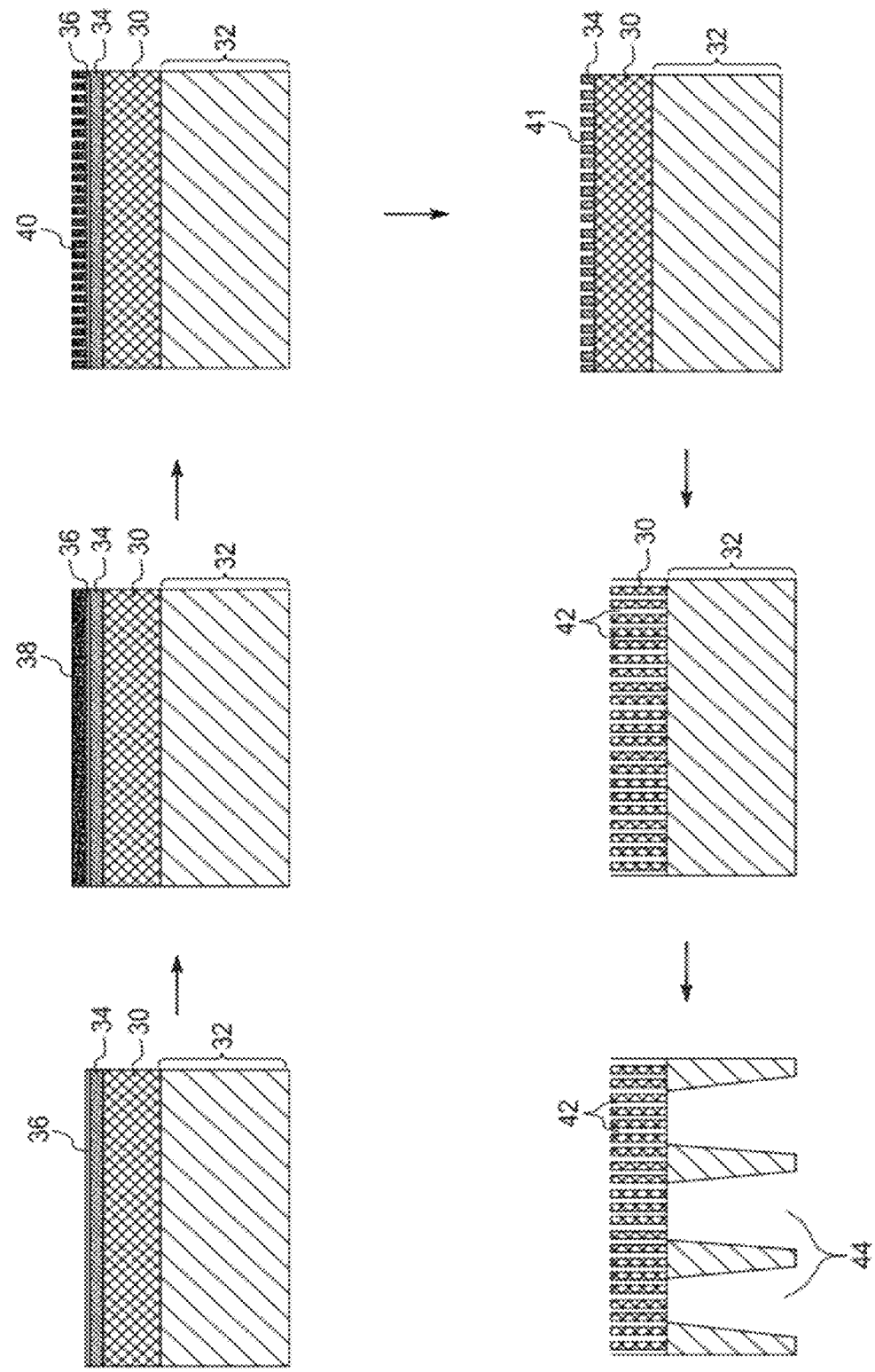
FIG. 2 is a schematic diagram an example of the method for fabricating membrane devices of the invention.

The invention relates to inorganic membrane devices and methods of making and using the membrane devices. The membrane device comprises a substrate having a network of pores. Further, the membrane device comprises a membrane layer at least partially coupled to the substrate. The membrane layer has a plurality of pores, which have an aspect ratio in a range from about 1:2 to about 1:100. The aspect ratio is defined as the ratio of pore size to membrane thickness. In certain embodiments, the pore size of the plurality of pores may be in a range from about 5 nanometers to about 100 nanometers.

For applications, such as virus filtration, a narrow pore size distribution is advantageous because a narrow pore size distribution enhances the flux rate of the filtering membrane device. In one embodiment, the flux rate of the membrane device is in a range from about 130 L/(m$^2$·h) to about 4100 L/(m$^2$·h). In one example, the clean-water flux rate of the membrane device may be in a range from about 130 L/(m$^2$·h) under a 0.1 bar pressure differential for a membrane layer that has a thickness of about 100 nanometers and a pore size of about 15 nanometers. In another example, the clean-water flux rate of the membrane device may be in a range from about 4100 L/(m$^2$·h) under a 1 bar pressure differential for a membrane layer that has a thickness of about 100 nanometers and a pore size of about 20 nanometers. In applications such as virus filtration or clearance from protein products, protein fractionation, protein purification, or protein desalting, a combination of high flux rate with narrow pore size distribution enables fast biomolecule differentiation with minimal product losses. In one example, the membrane device may comprise a silicon membrane layer of 15 nm nanopores having a thickness of about 100 nanometers. In another example, the membrane device may comprise a silicon nitride membrane layer having a thickness of about 200 nanometers and a pore size of about 20 nanopores. In one embodiment, the membrane device may have a diameter of up to 12 inches. In one example, the membrane device may comprise a plurality of membrane apertures defined by the pores in the substrate. The size of the apertures is in a range from 0.1 micrometer to 1 centimeter. In one embodiment, a size of the membrane device is in a range from about 5 millimeters to about 30 centimeters in diameter. The protein loss from the inorganic membrane device may be less than about 5 percent. The virus reduction of the membrane device may be greater than about 5 logs.

It is difficult to achieve a membrane device comprising a thin but robust membrane layer for pore sizes in a range from about 10 nanometers to about 100 nanometers. The high etch resistant layer of the devices of the invention makes it feasible to etch small nanopores through the thickness of the membrane layer. The high etch resistance of the mask layer allows very minimal or no etching of the mask layer in the etch chemistries while the underlying membrane layer is being etched through. The minimal or no etching of the mask layer enables maintaining good size fidelity of small nanopores and very narrow pore size distributions in the membrane layer. Suitable high etch resistance materials may include, but are not limited to, chromium, chromium oxide, aluminum, aluminum oxide, gold, or combinations thereof. For example, chromium has close to zero etch rate for the reactive ion etch (RIE) processes used to etch silicon nitride, silicon dioxide, and silicon. Only a thin layer of chromium is needed even for high-aspect-ratio etching. The thin mask layer is needed to maintain nanopore size fidelity. Chromium also exhibits a good adhesion to silicon nitride, silicon and silicon dioxide.

In certain embodiments, the method for making a membrane device comprises disposing a high etch resistant mask layer on a membrane layer, wherein the membrane layer is disposed on a substrate. The substrate may be porous or pores may be formed in the substrate after the pores are formed in the membrane layer. Next, a pore forming layer is disposed on the high etch resistant mask layer. Pores are formed in the pore forming layer by either using self-assembly of block copolymers or using nano-imprint lithography and the like. Subsequently, pores are transferred to the high etch resistant mask layer by plasma etch or a wet chemical etch, and then transferred to the membrane layer by etch using plasma etch or wet chemical etch. For example, pores are transferred to the membrane layer by plasma etch with selected etch chemistries.

FIG. 1 illustrates a flow diagram showing various steps of the method for making a membrane device. At block 12, a membrane layer is provided. The thickness of the membrane layer may be in a range from about 10 nanometers to about 1000 nanometers, 10 nanometers to about 50 nanometers, from about 50 nanometers to about 100 nanometers, from about 100 nanometers to about 500 nanometers, from about 500 nanometers to about 5000 nanometers, or less than about 15 nanometers. In one embodiment, the thickness uniformity of the membrane layer is better than about 5 percent. A thin membrane layer reduces transport resistance of the molecules through the membrane and enables high flux rates.

In certain embodiments, the membrane layer may be made of an inorganic material, such as silicon, or silicon nitride. The silicon nitride layer may be amorphous in nature. In embodiments where the membrane layer is made of silicon, the layer may be formed of single crystal silicon, poly-crystalline silicon or amorphous silicon. The membrane layer formed of single crystal silicon may exhibit enhanced mechanical strength.

The membrane layer may be deposited on a substrate. The substrate may be porous or pores in the substrate may be formed after forming the pores in the membrane layer. In embodiments where both the membrane layer and the substrate are made of silicon, an additional silicon dioxide layer may be disposed between the membrane layer and the substrate to separate the membrane layer and the substrate. In one example, silicon-on-insulator (SOI) wafers are used for fabricating silicon membrane devices. In embodiments where the membrane layer is silicon nitride and the substrate is made of silicon, the optional silicon dioxide layer is not required. Silicon nitride may be deposited by low-pressure chemical vapor deposition (LPCVD) or plasma-enhanced chemical vapor deposition (PECVD). Residual stress of silicon nitride is controlled by the deposition process and low-stress silicon nitride is preferred for the membrane layer. The stress in the membrane layer can be less than 250 MPa, preferably less than 50 MPa. Thickness uniformity is better than 5 percent. In one example, the substrate includes pores. The average pore size in the substrate is larger than that of the membrane layer and is in a range from 0.2 micrometer to 1 centimeter. The porosity of the substrate is in a range from about 30 percent to about 90 percent, from about 40 percent to about 60 percent, or from about 50 percent to about 70 percent. In one embodiment, the porosity of the substrate may be equal to or greater than about 70 percent. In one example, the thickness of the substrate is in a range from about 50 micrometers to 1000 micrometers, or from about 300 micrometers to about 500 micrometers.

At block 14, a high etch resistant mask layer is deposited on the membrane layer. The high etch resistant layer has a very low etching rate compared to the etch rate of the membrane layer in selected etch chemistries. In other words, for a given amount of time, the amount of etching in the mask layer is much less than the amount of etching in the membrane layer. The high etch resistance of the mask layer aids in forming pores of high aspect ratio in the filtering layer.

The high etch resistant mask layer may be deposited by employing deposition techniques, such as but not limited to, sputtering, thermal deposition, electron-beam evaporation, and the like. The thickness of the high etch resistant mask layer may be a few tens of nanometers. In one example, the thickness of the high etch resistant mask layer may be in a range of about 5 nanometers to about 100 nanometers, from about 5 nanometers to about 50 nanometers, from about 5 nanometers to about 30 nanometers, or from about 15 nanometers to about 20 nanometers.

In one embodiment, the high etch resistant mask layer may include chromium, chromium oxide, aluminum, aluminum oxide, gold, or combinations thereof. In another embodiment, the high etch resistance mask layer may include other metals or dielectric films that exhibits minimal or no etch rate in selected etch chemistries used for etching the membrane layer. The etch may be plasma etch or a wet chemical etch. The plasma etch is preferred to control the pore sizes in the membrane layer.

Optionally, an intermediate layer may be deposited on the high etch resistant mask layer (block 16). The intermediate layer may be silicon dioxide and deposited by employing techniques, such as but not limited to, sputtering, thermal deposition, chemical vapor deposition (e.g., plasma enhanced chemical vapor deposition). A thickness of the intermediate layer may a few tens of nanometers. In one example, the thickness of the intermediate layer may be in a range of about 10 nanometers to about 100 nanometers, from about 10 nanometers to about 50 nanometers, or from about 20 nanometers to about 30 nanometers.

At block 18, a pore transfer layer is deposited on the high etch resistant mask layer. Alternatively, in embodiments where a silicon dioxide layer is deposited on the high etch resistant mask layer, the pore forming layer may be deposited on the silicon dioxide layer. In these embodiments, the silicon dioxide layer is needed to facilitate controllable formations in the pore forming layer. For example, when the block copolymers are used as the pore forming layer, covalent bonds are formed between the silicon dioxide layer and the block copolymer brush layer to facilitate well controlled and uniform pore formation. In certain embodiments, the pore forming layer may be a polymer layer. In one example, the pore forming layer comprises of block copolymers. Two or more block copolymers may be deposited on the high etch resistant mask layer/silicon dioxide layer in the form of a coating, for example by spin coating. The thickness of the block copolymer coating may be in a range from about 20 nanometers to about 100 nanometers. In one example, a thickness of the block copolymer coating is in a range from about 20 nanometers to about 25 nanometers. In one example, polystyrene (PS) and poly(methyl methacrylate) (PMMA) block copolymers may be deposited on the high etch resistant mask layer/silicon dioxide layer as the pore forming layer.

At block 20, pores are formed in the pore forming layer. The pores may be fabricated by methods such as but not limited to, self-assembly of block copolymers, or nano-imprint and the like. Typically, block copolymers are two different polymer chains covalently bonded together on one end and molecular connectivity may force phase separation to occur on molecular-length scales. As a result, periodically ordered structures, such as cylinders, may be formed. The cylinders may be of nanometer size. The sizes and periods of the cylinders may be governed by the chain dimensions of the block copolymers. Further, the sizes and periods of the cylinders may be of the order of about 10 nanometers to about 50 nanometers, or about 15 nanometers to about 20 nanometers. Structures smaller than about 10 nanometers may also be obtainable if appropriate blocks are chosen. For example, blocks of the copolymer with a high Flory-Huggins interaction parameter and decreased block lengths may be used to obtain structures smaller than about 10 nanometers.

In certain embodiments, the block copolymer coating may be annealed to degrade one phase. The annealing may be done above the glass transition temperature of the block copolymers. The annealing above the glass transition temperature may facilitate formation of well-ordered cylinders in the block copolymer coating. In one example, the annealing may be done in a vacuum at a temperature of about 170° C. Subsequent to annealing, one phase of the block copolymer coating may be dissolved and the remaining phase may form pores. The pores in the pore forming layer may be transferred to the underlying high etch resistant layer or silicon dioxide layer by using a plasma etch or wet chemical etch. For example, when employing polystyrene (PS) and poly(methyl methacrylate) (PMMA) block copolymers, a 5-7 nanometers brush layer of a random PS-r-PMMA copolymer is first grafted to the substrate and annealed at 170° C., followed by spin coating of a ~25 nm film of PS-PMMA block copolymer film. Annealing of the block copolymer at ~170° C. results in the spontaneous self-assembly of surface perpendicular PMMA cylinders in a PS matrix with a pseudo hexagonal symmetry. PMMA cylinders are then removed upon blanket exposure to UV light (245 nm) and subsequently washed with acetic acid. The remaining nanoporous PS film is used to pattern transfer into the underlying high etch resistant layer or silicon dioxide layer.

Alternate methods of forming pores in the polymer layer (pore forming layer) may be nano-patterning, such as, but are not limited to nano-imprinting. Nano-imprint lithography is a low cost process with high throughput and high resolution. The pores are created in the pore forming layer by mechanical deformation of imprint resist and subsequent processes. The imprint resist is typically a monomer or polymer formulation that is cured by heat or UV light during the imprinting. Adhesion between the resist and the template is controlled to allow proper release.

Optionally, if the intermediate layer is employed on the high etch resistant layer, the pores may be formed in the intermediate layer (block 22). The pores in the intermediate layer may be transferred from the pore forming layer by using plasma etch or a wet chemical etch. Plasma etch enables improved control of the pore sizes. The pore size in the intermediate layer may be in a range from about 10 nanometers to about 100 nanometers, from about 20 nanometers to about 70 nanometers, from about 10 nanometers to about 30 nanometers, from about 15 nanometers to about 20 nanometers, or less than about 20 nanometers.

At block 24, pores are formed in the high etch resistant layer. The pores in the high etch resistant layer may be formed by employing techniques, such as but not limited to, plasma etching or wet chemical etch. For plasma etch, etch chemistries comprising chlorine and oxygen are used. For wet chemical etch, Transene Chromium Etchants 1020 and 1020AC may be sued. They are high purity ceric ammonium nitrate systems for precise, clean etching of chromium and chromium oxide films. Chromium Etchant 1020AC is nitric-acid free and exhibits a slower etch rate. Both etchants are compatible with positive and negative photoresists. Minimal undercutting is achieved with Chromium Etchant 1020AC. An etch rate of 30-40 A/sec is typical achieved by using these wet etch chemicals. The pores size in the high etch resistant layer may be in a range from about 10 nanometers to about 100 nanometers, from about 20 nanometers to about 70 nanometers, from about 10 nanometers to about 30 nanometers, or less than about 20 nanometers.

At block 26, the pores are formed in the membrane layer. The pore size in the high etch resistant layer and the membrane layer may be very close or about the same. The pores in the membrane layer may be formed using techniques such as, but not limited to, plasma etching. The pore size in the membrane layer may be in ranges from about 10 nanometers to about 100 nanometers, about 20 nanometers to about 70 nanometers, about 10 nanometers to about 30 nanometers, or less than about 20 nanometers.

The size of the pores of the membrane layer may be varied by varying the molecular weight of the block copolymers. In one embodiment, the size of the pores of the membrane layer is in a range from about 10 nanometers to about 50 nanometers. In one example, the pore size of the membrane layer, when using PS-b-PMMA copolymers, is about 15 nanometers.

At block 28, pores may be formed in the substrate to which the membrane layer is at least partially coupled. This step becomes optional when a porous substrate is used. While forming the pores in the substrate, the pores may also be formed at least in part in the intermediate layer or the etch stop layer disposed between the substrate and the filtering layer. In one embodiment, the pores in the substrate are formed at least in part using anodization. The process of anodization may include applying a voltage or current between the established electrode and the electrolyte. In these embodiments, the substrate may be single-crystal silicon. In one embodiment, a conducting layer is disposed on the substrate prior to forming the plurality of pores in the substrate. This may be achieved by ion implantation followed by thermal activation. If the intermediate layer is present between the substrate and the filtering layer, the pores may also be formed in the intermediate layer. The intermediate layer may include channels that are continuation of the pore columns of the substrate. The intermediate layer may be made of silicon dioxide or silicon nitride, if the filtering layer is made of silicon. However, the intermediate layer may be optional if the membrane layer is silicon nitride.

In one embodiment, the porous substrate may include a network of pores formed from pore columns and branched pores, which may be linked to each other to form a continuous network of pores. As used herein, the term "pore columns" refers to pores that are generally columnar in shape. The pore columns may be formed due to selective removal of the material of the substrate from determined places during processing of the membrane device, thereby forming a plurality of empty spaces or pore columns. As used herein, the term "branched pores" refers to pores that are formed between the pore columns of the material of the substrate. The branched pores connect the pore columns to provide a continuous network of pores in the substrate. In certain embodiments, the substrate may be an anodized substrate. As used herein, the term "anodized substrate" refers to a substrate that comprises pores formed by anodization of the substrate. The pores formed by anodization may be of different shapes and sizes, such as circular pores or columnar pores. In addition, the anodized substrate may also include pores formed by etching.

In one embodiment, the porous substrate may include macropores. As used herein, the term 'macropores" refers to pores in the substrate that may include pore columns and/or branched pores formed by anodization, or pores formed by standard lithography followed by etching, such as but not limited to plasma etch or wet chemical etch. In one embodiment, the macropores may be formed by wet chemical etch, or plasma etch, or both. The macropores may have a diameter in a range from about 0.2 microns to about 1000 microns. The branched pores are typically smaller in size than the pore columns. In one embodiment, the diameter of the branched pores may be in a range from about 0.2 microns to about 1 micron. Both the pore columns and the branched pores may be formed by anodization of the substrate. The pore network in the anodized substrate increases porosity of the filtering membrane. The pores of the filtering membrane may be smaller in size than the branched pores of the substrate.

EXAMPLE

An example of the fabrication process flow is described. A batch of 25 wafers can be processed in a single run. A membrane device is fabricated using double side polished silicon wafers (p-type with boron doping, 10-20 ohm·cm resistivity).

The process flow starts with depositing an ultrathin layer of silicon nitride 30 having a thickness of about 200 nanometers on the silicon wafer 32. The silicon nitride layer 30 is deposited on a silicon wafer 32. The silicon wafer 32 has a diameter of about 4 inches. The ultra-low stress silicon nitride layer 30 is deposited by low-pressure chemical vapor deposition (LPCVD) method in-house or by Rogue Valley Microdevices (Medford, Oreg.). Next, chromium high etch resistant mask layer 34 having a thickness of about 15 nanometers is deposited on the silicon nitride layer 30. The chromium etch mask layer 34 is deposited in an e-beam evaporator with thickness accuracy of just a few angstroms. A silicon dioxide layer 36 having a thickness of about 25 nanometers is subsequently deposited on the chromium etch mask layer 34. The silicon dioxide layer 36 is deposited in a plasma-enhanced chemical vapour deposition chamber. In a production environment, other chemical vapor deposition methods can also be used to deposit the silicon dioxide layer.

After preparing the wafer 32 with the desired structure, a 5-7 nanometer brush layer of a random PS-r-PMMA copolymer in 0.87 weight percent toluene solution is spin coated on the wafer 32 and grafted to the silicon dioxide layer 36 by annealing at 170° C. for 2-3 days to form covalent bonds between the brush layer and the silicon dioxide layer 36. This is followed by spin coating a ~25 nanometers thick film 38 of PS-PMMA block copolymers in 3 percent toluene solution on the brush layer. Annealing of the block copolymer at ~170° C. for 2 hours results in the spontaneous self-assembly of surface perpendicular PMMA cylinders in a PS matrix with a pseudo hexagonal symmetry. The PMMA cylinders are then removed upon blanket exposure to UV light (245 nanometers) and subsequently washed with acetic acid. The nanopores are in the PS film.

The PS phase with nanopores 40 is then used as etch mask to form the nanopores into the silicon dioxide layer 36 using fluorine-base plasma chemistries. For example, a reactive ion etch (RIE) tool may be used with a $CHF_3$ gas flow rate of 7 sccm and 5 m Torr chamber pressure at 20 degree Celsius. The RF power may be 150 W. The plasma etch is highly directional and the pore size and the pore distribution are maintained in the silicon dioxide layer 36 with great fidelity. The nanopores 40 are transferred into the thin chromium mask layer 34 using a chlorine-boron chloride ($BCl_3$)-oxygen plasma chemistry. The chromium mask layer 34 is selectively etched with the silicon dioxide mask 36. For example, an Inductively coupled plasma (ICP) tool may be used with a $Cl_2$ gas flow rate of 21 sccm, an $O_2$ gas flow rate of 9 sccm and an Ar flow rate of 3 sccm and 5 m Torr chamber pressure at 20 degree C. The rf (RF1) power and ICP power (RF2) may be varied (table 1). Both fluorine and chlorine-based plasma etches can be performed in the same plasma etch tool since different gas lines are connected to the plasma etch tool. Table 1 illustrates the etch rate of chromium mask layer 34 with silicon dioxide mask 36 using a plasma etch, where the plasma employs $CHF_3$.

TABLE 1

Chromium mask etch rate with a silicon dioxide mask by chlorine-oxygen plasma etch

| Radio Frequencies ($RF_1/RF_2$) for Plasma Etcher | Chromium mask layer etch rate (A°/min.) | Silicon dioxide etch rate (A°/min.) | Selectivity (chromium/ silicon dioxide) |
|---|---|---|---|
| 70 W/0 W | 105 | 17 | 2.8 |
| 70 W/150 W | 224 | 22 | 10.2 |
| 70 W/300 W | 678 | 88 | 7.7 |
| 100 W/0 W | 106 | 33 | 3.2 |
| 150 W/0 W | 111 | 40 | 2.8 |

After the nanopores 41 are formed in the chromium mask layer, the etch process is repeated with fluorine-based plasma chemistry to etch the nanopores 42 in the silicon nitride layer 30. Table 2 illustrates etch rate of silicon nitride layer 30 with chromium mask layer 34 using chlorine-oxygen plasma etch. The same or similar fluorine-based plasma chemistries can be used for silicon nitride layer 30 and silicon dioxide 36, because they have very similar etch resistance and etch selectivity. The plasma etch time for each layer is less than about 10 minutes because the layers are very thin.

TABLE 2

Silicon nitride etch rate with chromium mask layer 34 by $CHF_3$ plasma etch

| Radio Frequency (RF) for Plasma Etcher | Silicon Nitride etch rate (A°/min.) | Chromium mask layer etch rate (A°/min.) | Selectivity (silicon nitride/ chromium) |
|---|---|---|---|
| 120 W | 244 | 8.5 | 29 |
| 150 W | 343 | 5 | 69 |
| 180 W | 389 | 56 | 7 |

Next, macropores 44 are formed in the silicon substrate 32 by either wet chemical etch or selective plasma etch or a combination thereof. The wet chemical etch is advantageous for the formation of the macropores 44 due to the lower cost and very high etch selectivity of the process between silicon wafer 32, silicon nitride 30 and silicon dioxide layer 36. The anodization process may also be used to form macropores 44 in the silicon substrate 32.

Figure 3:
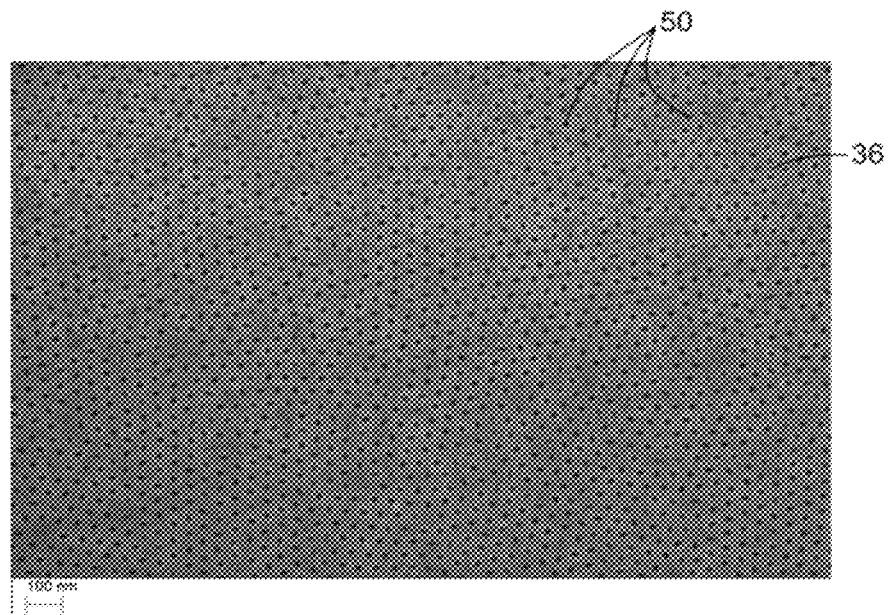
FIG. 3 is a micrograph showing nanopores formed in the silicon dioxide layer during the method of FIG. 2.
Figure 4:
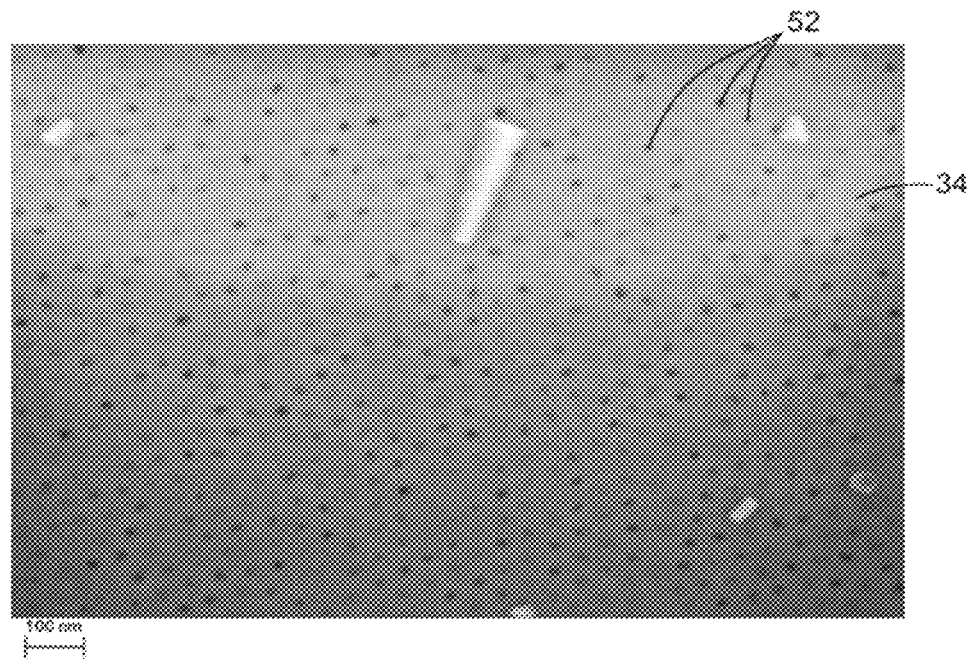
FIG. 4 is micrograph showing nanopores formed in the chromium etch mask layer during the method of FIG. 2.

FIG. 3 is a micrograph of the nanopores 50 in the silicon dioxide layer 36. The nanopores 50 have a narrow pore size distribution of about 15 nanometers to about 20 nanometers. FIG. 4 is a micrograph of the nanopores 52 in the chromium etch mask layer 34. As with the silicon dioxide layer, the nanopores 52 of the chromium etch mask layer 34 have a narrow pore size distribution in a range of about 15 nanometers to about 20 nanometers. The pore size distribution of the underlying silicon nitride layer 30 is also in a range from about 15 nanometers to about 20 nanometers.

In another example, the membrane device may be used for protein desalting. Efficient protein desalting is a required preparation step for many biological samples. The desalted samples may then be used for a variety of downstream detection technologies including but not limited to mass-spectroscopy, surface plasmon resonance (SPR) biosensors, electrophoresis (on-line), process analytical technologies (PAT), enzymatic assay, and nanowire sensors, and the like. In one example, the membrane device may be coupled to downstream detection technologies for in-line or on-chip desalting prior to the protein detection. The membrane device may provide properties that facilitate in-situ protein analysis. For example, properties such as narrow pore distribution, fast desalting rate, and minimized sample loss are some of the properties that are provided by the low thickness membranes.

The membrane device may also be used for separating one or more biomolecules from a biological fluid, such as serum. For example, the membrane device may be used to separate or concentrate cells, proteins, viruses, or DNA/RNA from a biological fluid based on size, charge, and/or affinity. In one embodiment, at least a portion of the membrane device may be functionalized to increase the affinity of the membrane for a particular type of biomolecules. Small pore size distribution of the membrane facilitates separation without losing many of the small molecular weight products. The membrane device of the present invention is also suitable for protein fractionation. "Protein fractionation" refers to division of the total biological fluid into different component parts. For example, protein fractionation may include separation of a mixture of proteins into single proteins or protein subgroups based on size, charge and/or affinity.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A method of making an inorganic membrane device, comprising:
 disposing a high etch resistant mask layer on a membrane layer, wherein the membrane layer is disposed on a substrate;
 disposing a pore forming layer on the high etch resistant mask layer, wherein the pore forming layer comprises a polymer layer;
 forming pores in the pore forming layer;
 forming pores in the high etch resistant mask layer; and
 forming pores in the membrane layer.

2. The method of claim 1, wherein the high etch resistant mask comprises chromium, aluminum, gold or a combination thereof.

3. The method of claim 1, further comprising a silicon dioxide layer disposed between the substrate and the membrane layer.

4. The method of claim 1, wherein a size of the pores in the pore forming layer, high etch resistant mask and the membrane layer is in a range from about 15 nanometers to about 20 nanometers.

5. The method of claim 1, wherein the membrane layer comprises a silicon layer, or a silicon nitride layer.

6. The method of claim 1, wherein the step of forming pores in the pore forming layer comprises nanopatterning, forming pores by self-assembly of block copolymers.

7. The method of claim 1, wherein forming pores in the high etch resistant mask comprises plasma etching, wet chemical etching, or both.

8. The method of claim 1, wherein forming pores in the membrane layer comprises plasma etching, wet chemical etching, or both.

9. The method of claim 1, further comprising disposing a silicon dioxide layer on the high etch resistant mask.

10. The method of claim 1, further comprising forming pores in the substrate.

11. The method of claim 1, wherein forming pores in the substrate comprises forming pores in the substrate and at least in part in an etch stop layer disposed between the substrate and the membrane layer.

12. The method of claim 1, wherein disposing a high etch resistant mask comprises sputtering, e-beam evaporation, or thermal evaporation.

13. The method of claim 1, wherein a thickness of the high etch resistant mask is in a range from about 10 nanometers to about 30 nanometers.

* * * * *